United States Patent
Zerfas

(10) Patent No.: US 6,340,096 B1
(45) Date of Patent: Jan. 22, 2002

(54) INVERTING SPRING ASSEMBLY

(75) Inventor: Gerald B. Zerfas, Grand Rapids, MI (US)

(73) Assignee: Z-Man Corporation, Grand Rapids, MI (US)

( * ) Notice: Subject to any disclaimer, the term of this patent is extended or adjusted under 35 U.S.C. 154(b) by 0 days.

(21) Appl. No.: 09/700,858

(22) PCT Filed: May 25, 1999

(86) PCT No.: PCT/US99/11533

§ 371 Date: Nov. 17, 2000

§ 102(e) Date: Nov. 17, 2000

(87) PCT Pub. No.: WO99/61825

PCT Pub. Date: Dec. 2, 1999

(51) Int. Cl.⁷ ................................................ B67B 7/00
(52) U.S. Cl. ................................................ 222/1; 251/7
(58) Field of Search ........................... 137/636; 251/7, 251/9, 242, 243, 337; 222/1

(56) References Cited

U.S. PATENT DOCUMENTS

| | | | | |
|---|---|---|---|---|
| 192,584 A | * | 7/1877 | Lapham ..................... 251/7 |
| 1,357,551 A | * | 11/1920 | Frey et al. ................. 251/9 |
| 3,174,716 A | * | 3/1965 | Salter ....................... 251/7 |
| 3,635,251 A | * | 1/1972 | Gaines .................. 137/636 |
| 3,724,818 A | * | 4/1973 | Roger ....................... 251/9 |
| 3,876,121 A | | 4/1975 | Preikschat |
| 3,926,175 A | | 12/1975 | Allen et al. |
| 3,965,925 A | | 6/1976 | Gooch |
| 4,259,985 A | | 4/1981 | Bergmann |
| 4,372,528 A | | 2/1983 | Raftis |
| 4,582,292 A | * | 4/1986 | Glotzback et al. ........... 251/9 |
| 4,602,137 A | | 7/1986 | Kawasaki |
| 4,921,206 A | | 5/1990 | Dunstan et al. |
| 5,201,324 A | | 4/1993 | Swierczek |
| 5,207,409 A | | 5/1993 | Riikonen |
| 5,522,806 A | * | 6/1996 | Schonbachler et al. ........ 251/7 |
| 5,529,581 A | | 6/1996 | Cusack |
| 5,692,729 A | * | 12/1997 | Harhen ..................... 251/9 |

FOREIGN PATENT DOCUMENTS

DE      2307035      8/1972

* cited by examiner

*Primary Examiner*—Philippe Derakshani
*Assistant Examiner*—Thach H. Bui
(74) *Attorney, Agent, or Firm*—Price, Heneveld, Cooper, DeWitt, & Litton

(57) ABSTRACT

An inverting spring assembly (10) including a housing, a resilient member (12), and an actuator (14). The housing includes a first support (16), a second support (18) opposite the first support, a third support (20), and a fourth support (22) opposite the third support. The first support and second support are a distance Y from another. The resilient member has a first end and a second end and is longer than Y. The resilient member is spaced between the first support and the second support with one end of the resilient member supported by the first support and the other end supported by the second support. The actuator is connected to the housing and appplies force to the resilient member in two directions causing the resilient member to be movable between a first position and a second position.

48 Claims, 2 Drawing Sheets

INVERTING SPRING ASSEMBLY

BACKGROUND OF THE INVENTION

The present invention generally relates to a spring mechanism. More specifically, the invention also relates to the use of a spring mechanism and actuator in a finished product including, but not limited to, a pinch valve assembly, manual operated fluid control valves, solenoid operated control valves, acceleration sensors, electrical switches, and snap action latching mechanisms.

Compression-type springs are known in the art. However, compression-type springs by their design are limited to resisting an external force from one specific direction and are limited to a specific amount of compression distance. The application of an external force on a compression spring causes it to compress between the external force and the structure to which the spring is attached. There is a maximum distance that a compression spring can safely be compressed without damaging the spring. The single direction of resistance and the possibility of damage to the compression spring are significant limitations for many applications.

Another significant problem area in the prior art pertains to snap action mechanisms. Examples of devices employing a snapping action between two positions are wall mounted light switches and electrical rocker switches. However, these devices snap in one direction or upon application of a small external force, snap in the other direction. The main problem with these mechanisms lies in the fact that the amount of force they can exert to resist movement from the desired position is limited. There is no known mechanism that provides all three desired attributes including: a snap action, a large force which keeps the mechanism in the desired position, and a large force that prevents the device from remaining in any position between the two distinct switch positions. Industry addresses the performance limitations of springs and snap action mechanisms by designing relatively complex mechanisms and/or by accepting the performance limitations of the prior art devices.

SUMMARY OF THE INVENTION

In one aspect of the invention, an inverting spring assembly includes a housing, a metal strip, and an actuator. The housing has a first support, a second support opposite the first support, a third support, and a fourth support opposite the third support. The first and second supports are at a distance Y from one another. The metal strip is supported by the first support and second support and is longer than the distance Y. The actuator applies force to the metal strip in a first direction and a second direction causing the metal strip to be movable from a first position and a second position.

In another aspect of the invention, an inverting spring includes a first support, a second support, a resilient member and an actuator means. The first support and second support are a distance Y apart from one another. The resilient member has a length greater than Y. One end of the resilient member is supported by the first support and the second end of the resilient member is supported by the second support. The actuator is in contact with the resilient member for applying force to the resilient member thereby allowing the resilient member to be movable between a first position and a second position using the actuator.

In another aspect of the invention, a pinch valve assembly includes a housing, a pinch member, and an actuator. The pinch member is slidably disposed of within the housing and moves between an extended and a retracted position. The pinch member is biased into the extended position and the retracted position. The actuator is interconnected with the pinch member such that the actuator biases the pinch member from an extended position engaging a soft wall tube to a retracted position disengaging the soft wall tube.

These and other advantages of the present invention will be further understood and appreciated by persons skilled in the art by reference to the following specification, claims, and appended drawings.

DETAILED DESCRIPTION OF PREFERRED EMBODIMENT

The inverting spring assembly of the present invention generally includes a first support member and a second support member spaced apart a distance Y, where Y is any length; a resilient member of a length X, where X is greater than Y; and at least one actuator to supply force to the resilient member. The resilient member is supported between the first support member and the second support member creating an arch in the resilient member. The inverting spring can be incorporated into an inverting spring assembly in which the inverting spring is encased in a housing. For purposes of example, the inverting spring assembly will, hereafter, predominantly be described as used in a pinch valve context, however, as described below and as will become apparent to those of ordinary skill in the art, the assembly is not limited to use as a pinch valve.

Figure 1:
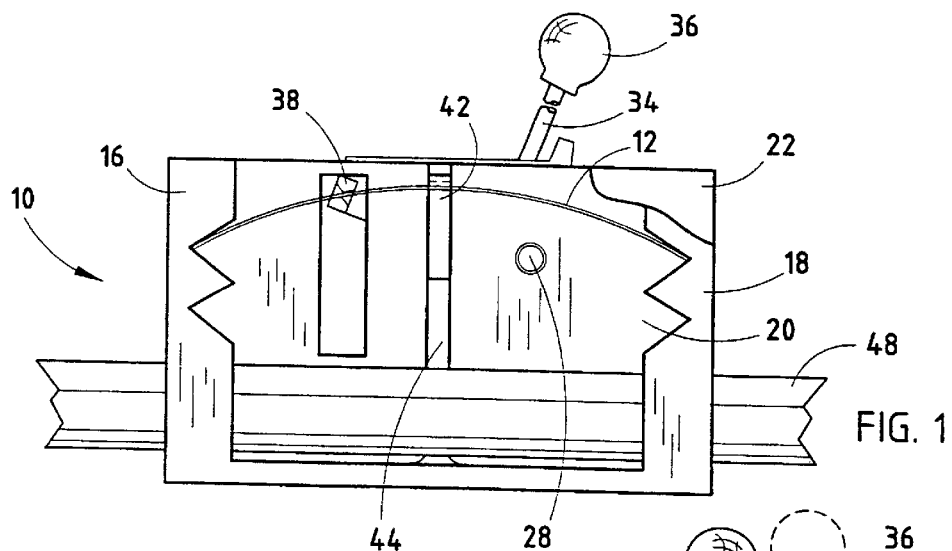
FIG. 1 is a partial fragmentary front elevational view with the third support member removed.
Figure 2:
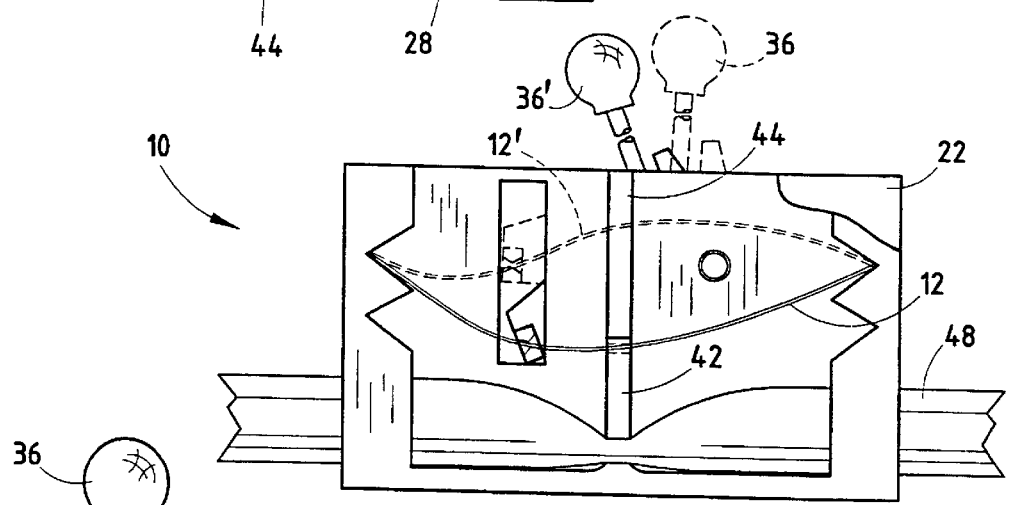
FIG. 2 is a partial fragmentary front elevational view with the third support member removed showing the resilient member in the second/closed position.

FIG. 1 shows the inverting spring assembly 10 in a pinch valve mechanism. As shown, the inverting spring assembly includes a resilient member 12, a lever actuator 14, a first support member 16, a second support member 18, a third support member 20, and a fourth support member 22. The resilient member has a length X and is supported at opposite ends by first support member 16 and second support member 18. The first support member and second support member are spaced a distance Y apart from one another where X is greater in length than Y such that resilient member 12 forms an arch. The greater the difference between X and Y results in a greater arch in the resilient member. Varying the arch height varies the force required to invert resilient member 12 from its first position (FIG. 1) to its second position (FIG. 2). The resilient member can be made from a flat strip of metal, preferably spring steel, or plastic and have varying lengths, widths and thickness. Typically, more force is required to invert a thick metal resilient member than a thin plastic resilient member. The length, width, thickness, arch height, and type of material selected for the resilient member can be varied to create inverting spring assemblies that resist various amounts of force to accommodate many uses. Varying these same parameters also changes the amount of force required to invert the resilient member.

Figure 3:
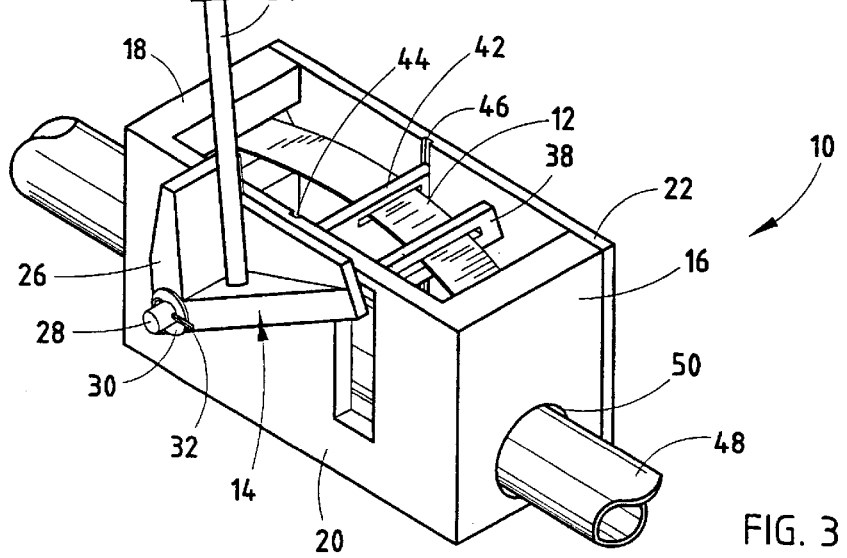
FIG. 3 is a rear perspective view of the inverting spring assembly.

As shown in FIG. 3, lever actuator 14 may include a saddle 26 attached externally to third support member 20 with a fastener, preferably a bolt 28. Bolt 28 is held in place with a spacer, preferably a washer 30, and a cotter pin 32. A lever 34 with a knob 36 is connected to the base of saddle 26. Actuator saddle 26 also includes a force lever arm 38 that extends through an opening in third support member 20. Preferably, force lever arm 38 is an integral component of the actuator saddle; however, the force lever arm may be attached using a fastener or adhesive.

The pinch valve mechanism may further include a pinch member 42 operatively coupled to resilient member 12 preferably at the center of resilient member 12 for delivery of the greatest possible pinching force. As also shown in FIG. 3, force lever arm 38 of lever actuator 14 and pinch member 42 both have elongated openings. The resilient member is placed through these openings during construction. The location on the resilient member that the force lever arm applies force can be varied. If force is applied in the center of the resilient member, at the maximum height of the arch, the amount of force needed to invert the resilient member to its second position and the travel distance of the resilient member at that position are at their greatest amount. As the force lever arm is moved away from the center of the resilient member, the amount of force needed to invert the resilient member decreases and the travel distance of the resilient member at the location where the force lever arm is applying the force also decreases. If the force is applied too close to an end of the resilient member, no inversion will occur. Consequently, the amount of force the spring can supply can be quite high while the amount of force needed to invert the spring can be much lower and may be increased or decreased, as desired or as needed.

The pinch member is placed within a first channel 44 in third support member 20 and a second channel 46 in fourth support member 22. The insertion of the pinch member into channels 44 and 46, which are preferably parallel and opposite one another, allows pinch member 42 to move vertically but not horizontally as resilient member 12 is moved between first and second positions.

When in use, the pinch valve employing the inverting spring assembly (FIGS. 1–3) has a tube 48 with soft walls inserted through an aperture 50 in first support member 16 and a corresponding aperture in second support member 18. Fluid flows through tube 48 when resilient member 12 is in the retracted first position because the pinch member is disengaged from the tube. However, when the resilient member is in the second position the pinch member engages the tube. This engagement and the fact the resilient member wants to extend to its maximum arch height allows the pinch member to apply a self-compensating amount of force to keep the tube pinched closed for extended periods.

As shown in FIG. 2, to move pinch member 42 into the second position with the pinch member engaging the soft walled tube, the operator of the inverting spring mechanism grasps knob 36 of lever actuator 14 and moves the actuator in a counter-clockwise direction (as oriented in FIG. 1 and 2). This movement applies force to resilient member 12 through force lever arm 38. This force causes the resilient member to make an S-type inversion into an extended and inverted second position thereby forcing the pinch member into the soft walls of tube 48 thereby shutting off the fluid flow. An operator can later move the lever actuator clockwise thereby moving the force lever arm to apply a force upwards on the resilient member causing the resilient member to invert back to its retracted first position. This disengages the pinch member from the soft wall tube 48 allowing the fluid to pass through the tube once again. The dashed lines in FIG. 2 show the S-type conversion resilient member 12' undergoes when moving from the first position to the second position. At some point during the S-type conversion, the resilient member reaches a point where the inverting force of the actuator is no longer required and the resilient member completes the inversion without any additional force applied to the resilient member.

Figure 4:
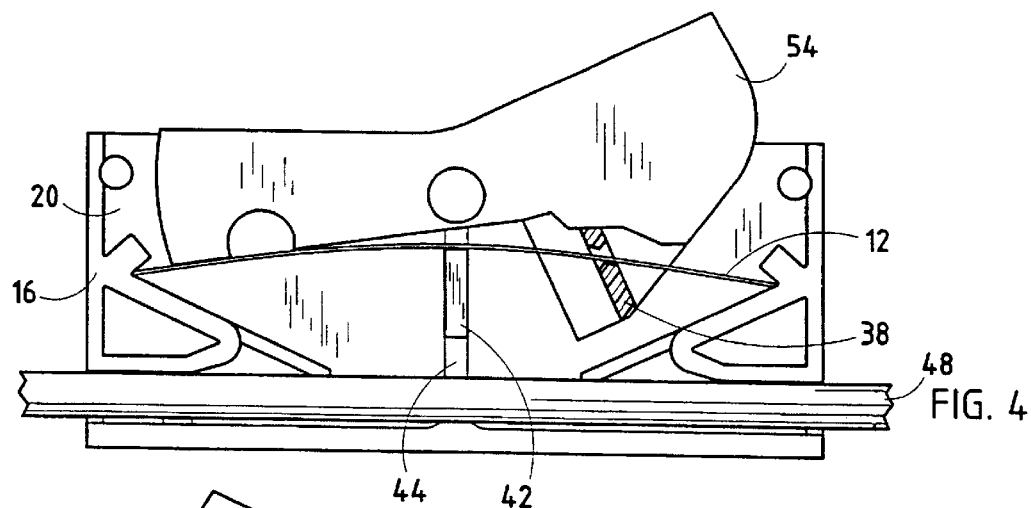
FIG. 4 is a cross-sectional elevational view of the inverting spring assembly in a rocker-type switch mechanism in an open state.
Figure 5:
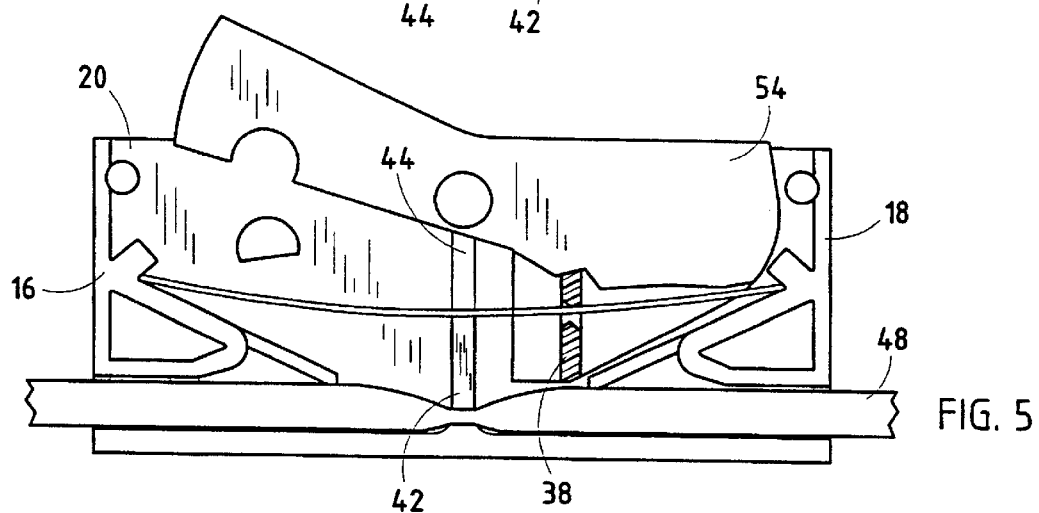
FIG. 5 is a cross-sectional view of a rocker switch in the closed position.

FIGS. 4 and 5 show an alternative embodiment in which a rocker type mechanical switch is used as an actuator in a pinch valve. This embodiment operates similarly to the first embodiment which employs a lever actuator 14; however, a rocker type actuator 54 is employed instead of the lever actuator. FIG. 4 shows the pinch member 42 disengaged from soft wall tube 48 while FIG. 5 shows the pinch member engaging the soft wall tube. The rocker type actuator is preferably made of plastic, but can be made from other substances as well. The sides and/or the top of the rocker actuator may be colored to indicate to the operator whether the pinch valve is open or closed, or if the inverting spring assembly is being used in, e.g., an electrical switch, whether the switch is on or off.

Figure 6:
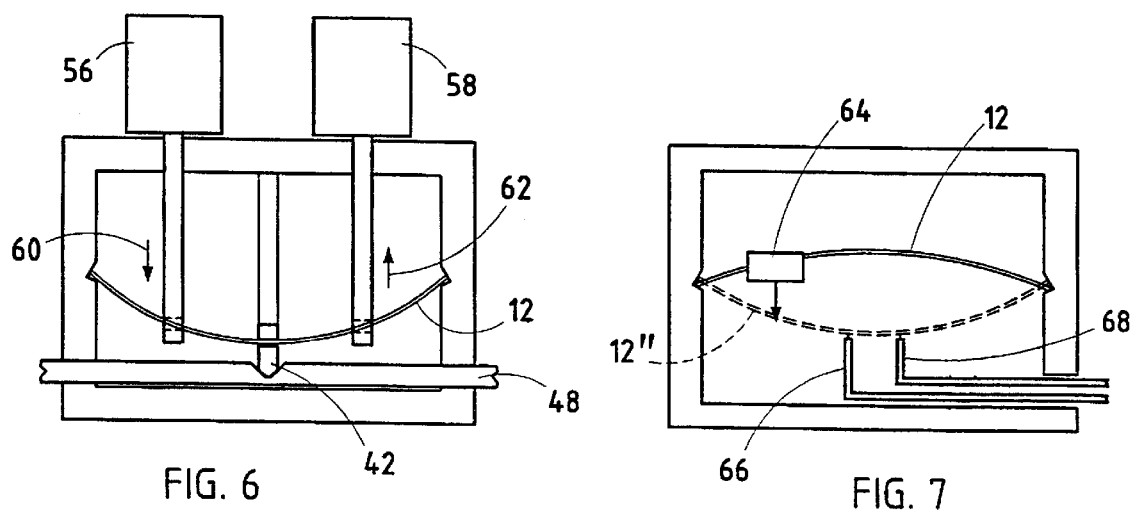
FIG. 6 is an alternate embodiment of the inverting spring assembly showing solenoids supplying force to the resilient member.

FIG. 6 shows a third embodiment of the present invention, which includes inverting spring assembly 10 and two solenoid actuators 56, 58. The solenoids may both be positioned on top of the housing, as shown in FIG. 6, or one solenoid placed above and the other below the housing (not shown). In this embodiment, upon receiving an electrical current, solenoid 56 supplies downward force 60 to resilient member 12 causing the resilient member to invert and pinch member 42 to engage soft wall tube 48. When the current is switched to solenoid 58, it supplies an upward force 62 to the resilient member causing the resilient member to invert and the pinch member to disengage the soft wall tubing. The inverting spring assembly only requires that solenoids 56, 58 supply a momentary force sufficient to invert the resilient member.

Figure 7:
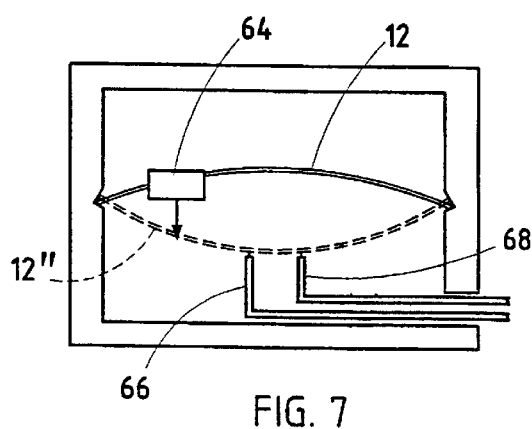
FIG. 7 is a cross-sectional view of an acceleration switch in the open position employing the inverting spring assembly.

As shown in FIG. 7, one aspect of the invention in which the inverting spring assembly may be employed, which is not in a pinch valve application, is in an acceleration switch. In this application, a mass 64 is interconnected with the resilient member. Varying the weight and position of the mass along the length of resilient member 12" varies the amount of acceleration or deceleration required to invert the resilient member and trip the acceleration switch. When a certain acceleration or deceleration rate is reached, the mass causes the resilient member to invert thereby completing the electrical connection between electrical contacts 66, 68. The completed connection is shown with the resilient member 12" in dashed lines in FIG. 7. When the connection is completed, a warning light illuminates or some other action occurs warning that the threshold acceleration has been reached.

An electrical switch employing the inventive inverting spring assembly would have similar electrical contacts to that of the acceleration switch shown in FIG. 7, but may have a rocker switch or the like as an actuator. Also, it has been contemplated that a motor or an air cylinder may be used as an actuator in the inverting spring assembly. Last, it also has been contemplated that the entire inverting spring assembly may be injection molded or extruded. In this embodiment the resilient member pivotally connected to at least one of or both the first support member or second support member. This allows relatively low manufacturing cost to be incurred.

The inverting spring assembly has been predominantly described herein as used in a pinch valve setting. However, as described herein the inverting spring assembly may be used in other finished products as well including, for example, manual operated fluid control valves, solenoid operated control valves, acceleration sensors, electrical switches, and snap action latching mechanisms. Those of ordinary skill in the art will find other uses for the inverting spring assembly beyond these uses and the assembly is not limited to such uses.

As shown above, the inverting spring assembly provides a scaleable amount of force by adjusting the thickness, width, length, material, and the arch height of the resilient member to suit desired needs. Also, the resilient member wants to extend back to its maximum arch height. The resilient member of the inverting spring assembly also provides a resistive force which increases until the resilient member reaches a point, dependent on the thickness, width, length, material, and the arch height of the resilient member at which the point the resilient member inverts. The resistive force occurs from both the first position and the second position. The inverting spring assembly also more than doubles the total possible travel distance of a conventional compression spring. The inverting spring assembly provides a snap action, a large force keeping the mechanism in the desired position, and a large force that prevents the device from remaining between two distinct switch positions. By providing all of these features in one assembly, the inverting spring assembly satisfies a long-felt need.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An inverting spring assembly comprising:
    a housing having a first support member, a second support member spaced opposite said first support member, a third support member, and a fourth support member spaced opposite said third support member, said first support member and said second support member being spaced at a distance Y from one another;
    a resilient strip having a first end defining a first fixed pivot, a second end defining a second fixed pivot, and a length X wherein said resilient strip is flexible and unrestrained between said first and second pivots and wherein the distance X is greater than the distance Y, said resilient strip supported between said first support member and said second support member with said first end of said resilient strip supported by said first support member and said second end of said resilient strip supported by said second support member; and
    an actuator interconnected with said housing for applying force to said resilient strip in both a first direction and a second direction thereby allowing said resilient strip to be repetitively moved between a first position and a second position.

2. The inverting spring assembly of claim 1, wherein said first support member has a first aperture and said second support member has a second aperture.

3. An inverting spring assembly comprising:
    a housing having a first support member, a second support member spaced opposite said first support member, a third support member, and a fourth support member spaced opposite said third support member, said first support member and said second support member being spaced at a distance Y from one another;
    a metal strip having a first end, a second end, and a length X wherein the distance X is greater than the distance Y, said metal strip supported between said first support member and said second support member with said first end of said metal strip supported by said first support member and said second end of said metal strip supported by said second support member;
    an actuator interconnected with said housing for applying force to said metal strip in both a first direction and a second direction thereby allowing said metal strip to be repetitively moved between a first position and a second position; and
    a pinch member operably coupled to said metal strip.

4. The inverting spring assembly of claim 3, wherein said third support member has a first channel, said fourth support member has a second channel, and said pinch member is positioned within said first channel and said second channel.

5. The inverting spring assembly of claim 4, wherein said first channel is located on said third support member intermediate said first support member and said second support member and said second channel is located on said fourth support member intermediate said first support member and said second support member.

6. The inverting spring assembly of claim 4, wherein said first channel is located in the center of said third support member and said second channel is located in the center of said fourth support member.

7. The inverting spring assembly of claim 4, wherein said first channel and said second channel are aligned opposite and parallel each other.

8. The inverting spring assembly of claim 1, wherein said actuator includes a manually actuated rocker switch or lever.

9. The inverting spring assembly of claim 8, wherein said manually actuated rocker switch or lever is positioned externally to said housing.

10. The inverting spring assembly of claim 1, wherein said actuator includes a first solenoid for applying a force to said metal strip in said first direction.

11. The inverting spring assembly of claim 10, wherein said actuator further includes a second solenoid for applying a force to said metal strip in said second direction.

12. The inverting spring assembly of claim 1, wherein said actuator is positioned so as to apply said force to said metal strip intermediate one of said first and said second ends of said metal strip and the center of said metal strip.

13. An inverting spring comprising:
    a first support member;
    a second support member being spaced a distance apart from said first support member;
    a resilient member having a first end defining a first fixed point and a second end defining a second fixed point and a length greater than the distance between said first and second support members, wherein said resilient member is flexible and unrestrained between said first and second pivots and said first and second pivots define a center section of the resilient member, said first end of said resilient member supported by said first support member and said second end of said resilient member supported by said second support member; and an actuator spaced from the first and second ends that is operatively coupled to said center section of said resilient member for applying force to the center section of said resilient member thereby allowing said resilient member to be movable between a first arcuate position to a second arcuate position using said actuator.

14. The inverting spring of claim 13, wherein said resilient member is a plastic or metal strip.

15. The inverting spring of claim 13, wherein said resilient member is a strip of spring steel.

16. The inverting spring of claim 15, further including a third support member and a fourth support member both interconnected with said first and second support members to form a housing.

17. The inverting spring of claim 16, wherein said actuator is external of said housing.

18. The inverting spring of claim 17, wherein the actuator includes a manually-actuated lever or rocker switch.

19. The inverting spring of claim 13, wherein said actuator includes a solenoid, motor, air cylinder, or a mass interconnected with said resilient member.

20. The inverting spring of claim 13, wherein said first support member further includes a first aperture and said second support member further includes a second aperture.

21. An inverting spring comprising:
a first support member;
a second support member being spaced a distance apart from said first support member;
a resilient member having a first end and a second end and a length greater than the distance between said first and second support members, said first end of said resilient member supported by said first support member and said second end of said resilient member supported by said second support member;
an actuator in contact with said resilient member for applying force to said resilient member thereby allowing said resilient member to be movable between a first position to a second position using said actuator; and
a pinch member operatively coupled to said resilient member.

22. The inverting spring of claim 16 further including a pinch member operatively coupled to said resilient member, wherein said third support member further includes a first channel, said fourth support member further includes a second channel, and said pinch member is spaced within said first channel and said second channel.

23. The inverting spring of claim 22, wherein said first channel is located in the center of said third support member and said second channel is located in the center of said fourth support member.

24. The inverting spring of claim 22, wherein said first channel and said second channel are aligned opposite and parallel from each other.

25. A pinch valve assembly comprising:
a housing;
a pinch member slidably disposed of within said housing and moving between an extended position and a retracted position, said pinch member biased into said extended and said retracted position;
an actuator interconnected with said pinch member such that the actuator biases the pinch member from said extended position engaging a soft wall tube to said retracted position disengaging said soft wall tube; and wherein said actuator is interconnected with said pinch member by a resilient member having a first end and a second end.

26. The pinch valve assembly of claim 25, wherein said resilient member is disposed within said housing.

27. The pinch valve assembly of claim 25, wherein said resilient member is a strip of metal or plastic.

28. The pinch valve assembly of claim 27, wherein said resilient member is a strip of spring metal.

29. The pinch valve assembly of claim 25, wherein said housing includes a first support member, a second support member opposite said first support member and spaced a distance from said first support member that is less than the length of said resilient member, a third support member, and a fourth support member opposite said third support member, wherein said resilient member is supported between said first and second support members.

30. The pinch valve assembly of claim 25, wherein said actuator is external said housing.

31. The pinch valve assembly of claim 25, wherein said actuator includes a force lever arm operatively coupled to said resilient member.

32. The pinch valve assembly of claim 31, wherein said force lever arm is positioned between the center of the resilient member and either said first end of said resilient member or said second end of said resilient member.

33. The pinch valve assembly of claim 29, wherein said first support member further includes a first aperture and said second support member further includes a second aperture.

34. The pinch valve assembly of claim 29, wherein said third support member further includes a first channel, said fourth support member further includes a second channel, and said pinch member is positioned within said first channel and said second channel.

35. The pinch valve assembly of claim 34, wherein said first channel is located on said third support member intermediate said first support member and said second support member and said second channel is located on said fourth support member intermediate said first support member and said second support member.

36. The pinch valve assembly of claim 34, wherein said first channel is located in the center of said third support member and said second channel is located in the center of said fourth support member.

37. The pinch valve assembly of claim 34, wherein said first channel and said second channel are aligned opposite and parallel from each other.

38. A pinch valve assembly comprising:
a housing;
a pinch member slidably disposed of within said housing and moving between an extended position and a retracted position, said pinch member biased into said extended and said retracted position;
an actuator interconnected with said pinch member such that the actuator biases the pinch member from said extended position engaging a soft wall tube to said retracted position disengaging said soft wall tube;
wherein said housing includes a first support member, a second support member opposite said first support member and spaced a distance from said first support member that is less than the length of said resilient member, a third support member, and a fourth support member opposite said third support member, wherein said resilient member is supported between said first and second support members.

39. An inverting spring comprising:

a first support member;

a second support member being spaced a distance apart from said first support member;

a resilient member having a first end defining a first fixed point and a second end defining a second fixed point and a length greater than the distance between said first and second support members, wherein said resilient member is flexible and unrestrained between said first and second pivots and said first and second pivots define a center section of the resilient member, said first end of said resilient member supported by said first support member and said second end of said resilient member supported by said second support member; and an actuator spaced from the first and second ends that is operatively coupled to said center section of said resilient member for applying force to the center section of said resilient member thereby allowing said resilient member to be movable between a first resilient position to a second resilient position using said actuator.

40. The inverting spring of claim 39, wherein said resilient member is a plastic or metal strip.

41. The inverting spring of claim 39, wherein said resilient member is a strip of spring steel.

42. The inverting spring of claim 39, further including a third support member and a fourth support member both interconnected with said first and second support members to form a housing.

43. The inverting spring of claim 42, wherein said actuator is external of said housing.

44. The inverting spring of claim 43, wherein the actuator includes a manually-actuated lever or rocker actuator.

45. The inverting spring of claim 39, wherein said actuator includes a solenoid, motor, air cylinder, or a mass interconnected with said resilient member.

46. The inverting spring of claim 39, wherein said first support member further includes a first aperture and said second support member further includes a second aperture.

47. The inverting spring of claim 39 further including a pinch member operatively coupled to said resilient member.

48. The inverting spring of claim 1, wherein the resilient strip is me tal or plastic.

* * * * *

UNITED STATES PATENT AND TRADEMARK OFFICE
CERTIFICATE OF CORRECTION

PATENT NO.     : 6,340,096 B1
DATED          : January 22, 2002
INVENTOR(S)    : Gerald B. Zerfas It is certified that error appears in the above-identified patent and that said Letters Patent is hereby corrected as shown below:

Title page,
Item [57], ABSTRACT,
Line 1, after "assembly" delete "(10)".
Line 2, after "member" delete "(12)".
Line 2, after "actuator" delete "(14)".
Line 3, after "first support" delete "(16)".
Line 3, after "second support" delete "(18)".
Line 4, after "third support" delete "(20)".
Lines 4 and 5, after "fourth support" delete "(22)".
Line 5, before "second" insert -- the --.

Column 3,
Line 65, "Fig. 1 and 2" should be -- Figs. 1 and 2 --.

Column 7,
Line 63, after "position;" insert -- and --.

Column 7, line 27 - Column 8, lines 1-3,
After "wall tube" delete "; and wherein said actuator is interconnected with said pinch member by a resilient member having a first end and a second end".

Column 8,
Line 1, insert -- 26. The pinch valve assembly of claim 25, wherein said actuator is interconnected with said pinch member by a resilient member having a first end and a second end. --
Line 4, delete "26." and insert -- 27. --.
Line 4, "claim 25" should be -- claim 26 --.
Line 6, delete "27." and insert -- 28. --.
Line 6, "claim 25" should be -- claim 26 --.
Line 8, delete "28." and insert -- 29 --.
Line 8, "claim 27" should be -- claim 28 --.
Line 10, delete "29." and insert -- 30. --.
Line 10, "claim 25" should be -- claim 26 --.
Line 18, delete "30." and insert -- 31. --.
Line 20, delete "31." and insert -- 32. --.
Line 20, "claim 25" should be -- claim 26 --.
Line 23, delete "32." and insert -- 33. --.
Line 23, "claim 31" should be -- claim 32 --.
Line 27, delete "33." and insert -- 34. --.
Line 27, "claim 29" should be -- claim 30 --.
Line 31, delete "34." and insert -- 35. --.
Line 31, "claim 29" should be -- claim 30 --.

UNITED STATES PATENT AND TRADEMARK OFFICE
CERTIFICATE OF CORRECTION

PATENT NO. : 6,340,096 B1
DATED : January 22, 2002
INVENTOR(S) : Gerald B. Zerfas It is certified that error appears in the above-identified patent and that said Letters Patent is hereby corrected as shown below:

<u>Column 8 cont'd,</u>
Line 36, delete "35." and insert -- 36. --.
Line 36, "claim 34" should be -- claim 35 --.
Line 42, delete "36." and insert -- 37. --.
Line 42, "claim 34" should be -- claim 35 --.
Line 46, delete "37." and insert -- 38. --.
Line 46, "claim 34" should be -- claim 35 --.

<u>Column 10,</u>
Line 21, "me tal" should be -- metal --.

Signed and Sealed this

Eleventh Day of February, 2003

JAMES E. ROGAN
*Director of the United States Patent and Trademark Office*